US012735843B2

(12) United States Patent
Gotthelf et al.

(10) Patent No.: US 12,735,843 B2
(45) Date of Patent: Sep. 15, 2026

(54) SILVER COMPOSITIONS AND METHODS FOR MAKING BIOCIDAL CURRENCY

(71) Applicants: Philip Gotthelf, Closter, NJ (US); Brian L. Wamsley, Nanuet, NY (US)

(72) Inventors: Philip Gotthelf, Closter, NJ (US); Brian L. Wamsley, Nanuet, NY (US)

( * ) Notice: Subject to any disclaimer, the term of this patent is extended or adjusted under 35 U.S.C. 154(b) by 884 days.

(21) Appl. No.: 17/403,375

(22) Filed: Aug. 16, 2021

(65) Prior Publication Data

US 2022/0049430 A1 Feb. 17, 2022

Related U.S. Application Data

(60) Provisional application No. 63/066,421, filed on Aug. 17, 2020.

(51) Int. Cl.
*D21H 21/36* (2006.01)
*A01N 59/16* (2006.01)
*C09D 11/03* (2014.01)

(52) U.S. Cl.
CPC ............. *D21H 21/36* (2013.01); *A01N 59/16* (2013.01); *C09D 11/03* (2013.01)

(58) Field of Classification Search
CPC ........ D21H 21/36; A01N 59/16; A01N 25/08; A01N 25/10; A01N 25/34; C09D 11/03; C09D 11/033; C09D 11/037; A01P 1/00
See application file for complete search history.

(56) References Cited

U.S. PATENT DOCUMENTS 6,534,128 B1 * 3/2003 Carlson ................. C09D 11/38 427/466
2007/0173564 A1 * 7/2007 Sohn ....................... C09D 5/24 523/210
2007/0190174 A1 * 8/2007 Holladay ................ A61P 31/16 424/618
2009/0155513 A1 * 6/2009 Yoneyama ............... C09D 4/06 428/64.2
2015/0002575 A1 * 1/2015 Blanton ................. C09D 11/38 106/18.32
2017/0174919 A1 * 6/2017 Kido ...................... C09D 11/38
2018/0371280 A1 * 12/2018 Garzon ................ B41M 5/0023
2019/0233665 A1 * 8/2019 Chopra .................. C09D 11/38

FOREIGN PATENT DOCUMENTS

JP 2009161708 A * 7/2009
JP 2010503737 A * 2/2010 ......... C08G 18/4833

OTHER PUBLICATIONS

English machine translation of JP-2009161708-A (Year: 2009).*
English machine translation of JP-2010503737-A (Year: 2010).*

* cited by examiner

*Primary Examiner* — Amber R Orlando
*Assistant Examiner* — Jeffrey Eugene Barzach
(74) *Attorney, Agent, or Firm* — Brian L. Wamsley, Esq.

(57) ABSTRACT

Compositions and methods for making biocidal currency are disclosed. The compositions of the within invention contain biocidal silver or silver compounds, which include elemental silver, nanoparticulate silver, colloidal silver, inorganic silver, including silver oxide, silver compounds and silver salts, that exhibit antibacterial and/or antiviral properties. Ink formulations that are used in the printing of currency, such as offset printing and intaglio printing, which incorporate the biocidal silver are also disclosed. In addition, the biocidal silver is formulated within pulp mixtures during the currency paper or linen-making processes. Methods of employing the biocidal silver or silver compounds of this invention include high pressure engravement printing where the silver impregnates the fiber, being cellulosic fiber, cotton or linen, forming a permanent biocidal layer within or on the surface of the currency, and offset printing.

6 Claims, No Drawings

SILVER COMPOSITIONS AND METHODS FOR MAKING BIOCIDAL CURRENCY

RELATED APPLICATIONS

This application claims priority to U.S. Provisional Application No. 63/066,421, filed Aug. 17, 2020, which is specifically incorporated herein by reference in its entirety.

FIELD OF THE INVENTION

The present invention relates to compositions and methods for making biocidal currency. Specifically, the compositions of the within invention contain biocidal silver or silver compounds that exhibit antibacterial and/or antiviral properties. Such biocidal silver or silver compounds include elemental silver, preferably in nanoparticulate form, and also colloidal silver, inorganic silver, including silver oxide, silver compounds and silver salts. As described, the biocidal silver may be incorporated into the ink formulations that are used in the printing of currency such as offset printing and intaglio printing. In addition, or alternatively, the biocidal silver may be formulated within pulp mixtures during the currency paper or linen-making processes. Particularly, methods of employing the biocidal silver or silver compounds of this invention in high pressure engravement printing such that the silver impregnates the fiber, being cellulosic fiber, cotton or linen, forming a permanent biocidal layer within or on the surface of the currency, are disclosed.

BACKGROUND OF THE INVENTION

It has long been recognized that paper/linen currency in circulation among the general population accumulates pathogens when it comes into contact with individuals that handle the currency. These pathogens, which include bacteria and viruses, are then transmitted to other individuals as the currency circulates, potentially causing the spread of diseases such as the common cold, flus and the like. The recent global viral pandemic, which has resulted in millions cases of Covid-19 and over 610,000 deaths in the U.S. alone, emphasizes the need to address every avenue of viral transmission among individuals and countries, including viral transmission caused by currency circulation. Accordingly, there is a need for currencies that inhibit the spread of viruses by inclusion of anti-viral agents that sanitize the currency, either as an integral part of the currency itself or as applied to the surface of the currency during the printing process.

It is well known that preparations of silver exhibit germicidal properties. Silver and silver compounds have been used as antimicrobial agents since the property was discovered by the Romans, who recognized the bactericidal or bacteriostatic effect of silver drinking vessels. Such antibacterial property of silver and silver compounds has been used in various contexts. For example, U.S. Pat. No. 6,210,474, which is hereby incorporated by reference herein in its entirety, describes the use of biocidal agents in polymers and ink toners for preventing microbial growth. U.S. Pat. No. 6,444,726, hereby incorporated by reference herein in its entirety, describes biocidal compositions comprising sparingly soluble silver compounds deposited on an inert oxidic support for use against microorganism growth in coating medical devices, such as catheters. U.S. Patent Application 2013/0189499, hereby incorporated by reference herein in its entirety, describes inks which include a mixture of solvent and a silver salt biocide, such as silver sulfate. U.S. Pat. No. 8,616,694, hereby incorporated by reference herein in its entirety, discloses ink jet compositions containing silver particles to make metallic glossy prints, but the prints themselves have not been demonstrated to possess antimicrobial effectiveness. And U.S. Pat. No. 9,617,437, hereby incorporated by reference herein in its entirety, describes aqueous anti-bacterial inks comprising silver sulfonated polyester-silver nanoparticles to address problems related to bacterial and fungal contamination through contact with surfaces and objects within, inter alia, hospitals.

However, none of the above references utilize silver, silver compounds, silver nano-particles or silver salts as a viricide, particularly in printing inks used for currency or in the substrate material itself used for the currency. Recent studies, however, have established that silver, in various forms, also displays anti-viral activity. For example, in 2003 a silver composition comprised of silver colloid in water, at 22 ppm strength, known as ASAP, was demonstrated to have viricidal activity against hepatitis B. See "Viricidal Activity of ASAP against Hepatitis B Virus & Cytotoxicity of ASAP, March 2003-June 2003,"s VIRIDIS BioPharma Pvt. Ltd., of Mumbai, India, hereby incorporated by reference herein in its entirety. There, the viricidal activity of ASAP solutions against hepatitis B virus was determined by the ability of ASAP to inhibit both DNA polymerase activity and reverse transcriptase activity. Similar ASAP solutions were also shown to be effective against *Yersinia Pestis* virus, the etiological agent of plague. See Kill-Time Studies Bactericidal Activity of ASAP Silver Solution on *Yersinia Pestis*, The Etiological Agent of Plague," Jul. 8, 2003, hereby incorporated by reference herein in its entirety.

U.S. Patent Application 2014/0155482, hereby incorporated by reference herein in its entirety, describes the use of fluid compositions containing "virucide[s] of natural origin" as coatings on flexible supports, which may include currency. The viricides include monolaurin, lauric acid, lactoferrin and essential oils having antiviral activity. However, coatings of such flexible substrate tend to wear off with use and time. Further, the use of antiviral silver or antiviral silver compositions are not disclosed.

Accordingly, a need exists for currencies that do not just provide antibacterial properties, but antiviral properties as well. Indeed, antiviral currencies are of immediate and paramount importance. The present invention is directed to this need and to the deficiencies in the prior art.

Therefore, the object of this invention is to provide currencies that neutralize viruses that may come into contact with the surface of the currency, either when the currency is in circulation or otherwise, by the use of antiviral silver or antiviral silver compositions in the ink used for printing the currencies or in the substrate material on which the currency is printed, or both. The resulting antiviral currency may be produced by adding the antiviral silver composition to the pulp mixture or rag blends in the paper making process, resulting in the currency substrates containing a biocidally effective amount of viricidal silver as an integral part of the substrate whether adsorbed within the substrate fiber or on the substrate surface, by adding the antiviral silver composition to the inks used in printing the currency. The preferred printing processes are offset, or lithographic printing, and high-pressure engraving printing, such as intaglio printing. It is also intended that such currencies provide anti-bacterial properties.

BRIEF DESCRIPTION OF THE INVENTION

It is therefore an object of the present invention to provide biocidal currency that neutralizes or destroys surface bacteria and viruses, thus reducing or eliminating the spread of disease through the circulation of the currency. It is further an object of this invention to provide biocidal currency compositions and methods for making biocidal currency.

It is also an object of this invention to provide compositions containing biocidal agents, including bactericides and viricides, which are used in the currency making process, whether the currency is wood pulp, cotton or linen based, or a combination thereof.

It is a further object of this invention to provide a biocidal currency manufactured from materials that contain biocidal agents.

It is also an object of this invention to provide compositions containing biocidal agents, including bactericides and viricides, that are used in the processes for printing currency, and wherein those processes are offset printing, lithographic printing or intaglio printing, where the currency is cellulosic (wood), cotton, linen or polymer based.

It is a further object of this invention to provide a method for making currency biocidal by imprinting the currency with biocidal agents such as inks.

It is also an object of this invention to provide compositions and methods for making biocidal currency, wherein the biocidal/bactericidal/viricidal agents are silver (Ag) in elemental form, silver oxide, silver in nanoparticulate form, colloidal silver, inorganic silver or silver compounds, or silver salts. Lastly, it is an object of this invention to provide compositions and methods for making biocidal currency not provided in the prior art.

Thus the present invention is directed to compositions of offset printing inks and intaglio printing inks that comprise, in addition to other necessary components specific to the particular ink, silver (Ag) in elemental form, silver oxide, silver in nanoparticulate form, colloidal silver, inorganic silver or silver compounds, or silver salts (hereinafter collectively referred to as "biocidal or viricidal silver (Ag)"). Specifically, the present invention is directed to a method of producing viricidal currency by imprinting the currency with the viricidal offset inks and/or intaglio inks. The biocidal silver is present in the inks in an amount effective to result in a viricidal effective amount of silver being present on the surface of the currency after the printing process. In certain embodiments, the viricidal silver is present in the inks in an amount ranging from about 0.1 to about 5000 ppm by weight of the Ag. In a preferred embodiment of the invention, the viricidal silver is present in the inks in an amount ranging from about 0.1 to about 50 ppm by weight of the Ag. In a further preferred embodiment of the invention, the viricidal silver is present in the inks in an amount ranging from about 0.2 to about 30 ppm by weight of the Ag. In an additional preferred embodiment of the invention, the viricidal silver is present in the inks in an amount ranging from about 0.5 to about 15 ppm by weight of the Ag. In addition to the viricidal Ag, the ink compositions of this invention also comprise ingredients to maintain the viricidal Ag in suspension or solution. In one embodiment of the invention, ink containing an effective biocidal amount of silver, is injected into the currency substrate fiber by high-pressure engraving printing.

Similarly, the present invention is directed to a method of producing viricidal currency by incorporating viricidal Ag into the pulp or other slurries during the paper or linen making process resulting in the finished substrates containing viricidal Ag. This is accomplished by adding the viricidal silver to the substrate pulp mixture in an amount that would result in a viricidally effective amount of the silver in the finished substrate, prior to printing the currency. In certain embodiments, the viricidal silver is present in the finished substrates in an amount ranging from about 0.1 to about 5000 ppm by weight of the Ag. In a preferred embodiment of the invention, the viricidal silver is present in the finished substrates in an amount ranging from about 0.1 to about 50 ppm by weight of the Ag. When one considers that a single note of U.S. currency weighs one gram, the resulting actual weight of silver according to this embodiment would be about 0.1 to about 50 mcg/note. In a further preferred embodiment of the invention, the viricidal silver is present in the finished substrates in an amount ranging from about 0.2 (0.2 to about 30 mcg) by weight of the Ag. In an additional preferred embodiment of the invention, the viricidal silver is present in the finished substrates in an amount ranging from about 0.5 to about 15 ppm (0.5 to about 15 mcg) by weight of the Ag.

DETAILED DESCRIPTION OF THE INVENTION AND PREFERRED EMBODIMENTS

In accordance with the above objects, the named inventors herein have determined that, when formulated within ink compositions used for printing currency, or formulated within the substrates used for currencies, elemental silver, silver compounds and silver compositions, as defined herein, display biocidal activity, including antibacterial and/or antiviral activity, on the surface of as well as within the currency, that has not been contemplated or disclosed by the prior art. Moreover, the concentration of the biocidal silver necessary to achieve the biocidal activity, measured as the weight of Ag, has also not been contemplated or disclosed by the prior art.

Biocidal Silver Compositions

In accordance with the above objects for biocidal currency, the silver biocidal/viricidal agents are silver (Ag) in elemental form, silver oxide, silver in nanoparticulate form, colloidal silver, inorganic silver or silver compounds, and silver salts. Specifically, in some embodiments of the invention the silver is in the form of a silver salt, whether soluble or sparingly soluble in aqueous solution.

Aqueous colloidal suspensions of metallic silver particles and silver in oxidation state [Ag(O)], and ionic silver in states Ag(I), Ag(II) and Ag(III) were demonstrated to kill or disable organisms hazardous to the human body. See U.S. Pat. No. 7,135,195. In concentration ranges between 5 and 40 ppm and silver particle size in the range of 0.005 to 0.015 microns, colloidal suspensions of silver were shown to be effective against at least 15 human pathogens and a variety of topical and internal human ailments, and were shown to inhibit DNA polymerase isolated from Hepatitis B virus. Further, oxidized silver has been found to retain antiviral properties and, in addition, because oxidized silver may be black, it can be particularly used in black and gray inks, or in any ink colors that have a black component.

Examples of sparingly soluble silver salt compositions are found in U.S. Pat. No. 6,444,726. Although many of these biocidal silver compositions have been shown to have bactericidal properties, the present inventors have discovered that they also have viricidal properties and particularly when the silver compositions expose the silver on the surface of a substrate, i.e., currency. The biocidal silver compositions of the '726 patent are formulated with synthetic oxidic supports, and include solutions, suspensions, emulsions and polymers, for use as integral parts of products such as plastics.

The ASAP study, previously cited, established that multivalent silver colloidal compounds in water at 22 ppm strength, had viricidal activity against hepatitis B. The silver present in the colloid was reported to be primarily metallic silver with silver oxide in the form of Ag(II)O to be the predominate oxidation state. See Analytical Report, NDE Analytical, May 8, 2002. The viricidal activity of ASAP solutions in strengths 10 ppm, 14 ppm plus 1.5% $H_2O_2$, and 22 ppm were evaluated against hepatitis B virus.

In a preferred embodiment of this invention, the silver is present in colloids in nanoparticulate form, (AgNPs). Colloidal silver generally consists of nano-sized clusters of silver atoms of neutral polarity in aqueous suspension. The silver clusters range in size from a few nanometers to 100 nm. Silver NP colloids may be made by several means, including by electrochemical processes. See *Colloidal Nano Silver—Its Production Method, Properties, Standards and its Bio-efficacy as an Inorganic Antibiotic*, Laroo, H., J. Phys. Chem. Biophys., Vol. 3, Issue 5, 2013. The neutral AgNPs in these colloids were found to be effective at a Minimum Inhibitory Concentration (MIC) of less than 3 ppm as compared to ionic silver.

Colloidal silver nanoparticles can also be obtained by chemical reduction of silver nitrate in water with sodium borohydride ($NaBH_4$) in the presence of sodium dodecyl sulfate (SDS) as a stabilizer. See Song, K. C., Lee, S. M., Park, T. S. el al Preparation of colloidal silver nanoparticles by chemical reduction method, *Korean J. Chem. Eng.* 26, 153-155 (2009), incorporated herein in its entirety by reference. There, the obtained nanoparticles were characterized by their UV-vis absorption spectra and transmission electron micrograph (TEM) images. The UV-vis absorption spectra showed that $NaBH_4$ served not only as a reducing agent but also as a stabilizer, which protects the aggregation of silver nanoparticles.

In another preferred embodiment of this invention the silver composition may be present as nanoparticles in a polyester matrix, such as a sulfonated polyester. See U.S. Pat. No. 9,617,437 (issued 2017). In another embodiment of this invention the biocide silver may be present in s silver-silica nanocomposite material. See *Antimicrobial Properties of a Novel Silver-Silica Nanocomposite Material*, Egger, Salome, et al., Applied and Envt'l Microbiology, Vol. 75, No. 9, pp. 2973-2976 (2009).

In another embodiment, silver colloids can be formed by chemical reduction using dextrose. Formation of colloidal silver nanoparticles stabilized by $Na^+$-poly(γ- glutamic acid)-silver nitrate complex via chemical reduction process. Colloids and Surfaces B: Biointerfaces. Volume 59, Issue 2, 1 Oct. 2007, Pages 171-178, incorporated herein in its entirety by reference. Macromolecular and polyanionic $Na^+$-poly(γ-glutamic acid) (PGA) silver nitrate complex acted as both a metal ion provider and a particle protector to fabricate nanosized silver colloids under chemical reduction by dextrose. The formation and size of particles have been characterized from transmission electron microscopy (TEM), dynamic light scattering analysis and UV-vis spectrophotometer. The results showed that the average particle size was 17.2±3.4 to 37.3±5.5 nm, apparently depending on the complex concentration. In addition, the in vitro cytotoxicity evaluated by L929 fibroblasts proliferation and antibacterial activity against Gram-positive strain (methicillin-resistant *S. aureus* (MRSA)) and Gram-negative strain (*P. aeruginosa*) bacteria was assessed.

Kumar, A., et al., Phase transfer of silver nanoparticles from aqueous to organic solutions using fatty amine molecules, Journal of Colloid and Interface Science. Vol. 264. Issue 2, 15 Aug. 2003, Pages 396-401, incorporated herein in its entirety by reference. The authors demonstrated the phase transfer of silver nanoparticles synthesized in an aqueous medium into hexane containing the cationic surfactant octadecylamine (ODA). This process rendered the nanoparticles sufficiently hydrophobic and dispersible in the organic phase. The ODA-stabilized silver nanoparticles were separated out from the organic phase in the form of a powder and were readily re-dispersible in different organic solvents.

Currency Printing

The printing of currency commonly involves a number of printing processes, including offset printing, also known as lithographic printing, intaglio or engravement printing, etc. The production of modern U.S. currency is a complex process using specialized equipment and time-honored printing techniques. And while most paper used for items such as newspapers and books is primarily made of wood pulp, currencies such as in the U.S. are printed on paper known as "rag paper," composed of 75% cotton and 25% linen. In the U.S., notes of $5 and above with subtle background colors, offset (or lithographic) printing is the first step of production. The background design is duplicated on a film negative, and is then transferred to a thin steel printing plate with a light sensitive coating through exposure to UV light, in a process known as "burning a plate." The background colors are then printed on special high-speed rotary presses, such as Simultan presses. Ink is transferred from the printing plates to rubber "blanket" cylinders, which then transfers the ink to the paper as it passes through the blankets.

Intaglio printing is used for the portraits, vignettes, scrollwork, numerals and lettering unique to each denomination. From an Italian word meaning to cut or engrave, "intaglio" refers to the design being skillfully "carved" into steel dies with sharp tools and acids. Since 1968, all currency has been printed by means of the dry intaglio process, which utilizes special paper and non-offset inks, whereby wetting of the paper prior to printing is unnecessary. In this process, fine-line engravings are transferred to steel plates from which an impression is made on sheets of distinctive paper. The images are combined and transferred to a printing plate through the process of siderography. Engraved plates are mounted on the press and then ink is applied to the plates containing note impressions, which are then wiped clean, leaving ink only in the recessed, engraved image area. The plate is pressed against the sheet of paper pressure of up to 20,000 psi as to actually press the paper into the lines of the plate to pick up the ink. Paper is laid atop the plate, and when pressed together, ink from the recessed areas of the plate is pulled onto the paper to create the finished image. Both faces and backs are printed in this manner—backs first. After the faces are printed, the sheets are then typographically overprinted with Treasury Seals and serial numbers.

Offset Printing Inks

Offset printing inks are compounded especially for use on offset presses. They must be able to withstand reaction with the press fountain solution it encounters on the dampened offset plate. Ideally, the ink on the ink roller should not absorb water (water-in-ink emulsification), nor should the ink break down and combine with the fountain solution on the non-printing areas of the plate (ink-in-water emulsification). Either of these emulsification problems will tend to impair the body, color, or drying qualities of the ink, or cause tinting on the non-printing areas of the plate and printed sheets.

Offset printing inks, predominantly oil-based but also includes aqueous formulations, are described in U.S. Pat. Nos. 5,00,792 and 6,444,017, both of which are incorporated in their entirety herein by reference. Offset printing ink is made of three main ingredients: Pigment, which is the coloring material in the ink: Vehicle, which is the liquid that holds the particles of pigment: and Modifiers, which control the drying of the ink as well as other factors such as smell, scuff resistance, and fading.

PIGMENT: There are two basic types of pigment used in offset printing inks. Organic pigment, which is made from carbon, is used for black ink. Inorganic pigments, which are made by mixing various chemicals together, are used for colored inks. For example, sulfur, silica, or China clay can be combined with either soda ash or sulfate salts to make ultramarine blue ink.

COLORANTS/BINDERS: Though no specific limitation regarding the amount of ink colorant to be used (other than an effective amount) or is required, it is preferred that the ink colorant be present at from about 0.1% to 10% by weight. Additionally, either pigments and/or dyes can be used in the formulation. For example, suitable ink colorants can be the self-dispersed carbon pigment known as CABOJET™ 300. Additionally, ink colorants such as those described in U.S. Pat. Nos. 5,356,464 and 5,709,737, the entire teachings of which are incorporated herein by reference, can also be used. Further, when an oxidized Ag is employed, the black coloration can also be used as a colorant.

VEHICLE: Vehicle is the liquid that holds the particles of pigment and carries them to the paper. There are two kinds of vehicles used in offset inks: oils such as soya oil or linseed oil (which is a yellowish oil made from flax): and synthetic vehicles, which are liquids resulting from the mixture ole chemicals. For example, phenol and formaldehyde mixed together make phenolic resins, sometimes used in printing inks as a vehicle.

MODIFIERS: Modifiers are ingredients added to the ink to control drying and other qualities such as smell and resistance to fading.

OPTIONAL INGREDIENTS: include solvents, binders and surfactants. Solvents can also be added to the formulations for good results. Such solvents can include alcohols and polyhydroxylated solvents including glycerols, glycols, glycol ethers, pyrrolidones, and combinations thereof. When using one of these or other solvents, the solvent should be present at from 0.5 to 50% by weight. Binders can preferably be an acrylate binder, an acrylic acid, a methacrylate acid including its esters, and combinations thereof. JONCRYL™ is one commercially available acrylate binder that is acceptable for use. Additionally, other water-insoluble monomers can be used for the binder. For example, the binder can be comprised of co-monomers such as a styrene and a butyl methacrylate. Other suitable binders that can be used include polyamides, vinylalcohols, vinyl acetates, polyvinylpyrrolidones, cellulosics, and urethanes. The binder should be present at from about 0.01% to 10% by weight. Additionally, molecular weights for the binder can be from about 1,000 to 15,000. Though these inks and binders are discussed specifically, other ink colorants or binders optimized for thermal ink jet ink can also be used. Additionally, as stated previously with respect to other embodiments, the nonionic surfactant(s) can be selected from the group consisting of alkoxylated octylphenols, alkyl phenoxypoly(alkyleneoxy)ethanols, silicone glycol copolymers including polyalkylene oxide-modified polydimethylsiloxanes, alkoxlyated tetramethyl decyndiols, alkoxylated trimethylnonanols, polyoxyethylene ethers, ethylene oxide/propylene oxide copolymers, fluorosurfactants, and nonionic alkoxylated surfactants.

The present invention is intended to include all types of offset printing inks, both non-aqueous and aqueous, to which biocidal silver compositions may be added. Preferred embodiments of the within invention are directed to offset printing ink compositions which comprise antiviral silver compositions. Ideally, the concentration of the viricidal silver composition in the ink is such that a uniform concentration is achieved in the paper or linen of 5 ppm by weight of silver, after drying, although other uniform concentrations of silver in the paper are also contemplated to be within the scope of this invention. Accordingly, the viricidal silver may be present in an amount of from about 0.5 parts per million to about 5,000 parts per million.

EXAMPLES

The offset printing inks of the present invention include embodiments which comprise various combinations of nonionic surfactants and include effective amounts of viricidal silver. Such formulations include effective amounts of an ink colorant and a nonionic surfactant having an HLB value from about 4 to 14. Optionally, additional nonionic surfactants, solvents, and binders can be added. In another formulation, an effective amount of an ink colorant, at least two nonionic surfactants, each being present at from about 0.01% to 10% by weight (preferably 0.01% to 2% by weight) and an effective amount of at least one binder (such as an acrylate binder) is disclosed.

It has been determined that ink formulations containing lesser concentrations of biocidal silver than for silver containing solutions can provide germicidal/biocidal effectiveness throughout the paper currency expected lifecycle. Silver colloids can be introduced to ink formulations by chemical reduction of silver nitrate or electrical reductions of elemental silver into the ink solution or components thereof. Alternatively, silver can be directly introduced by adding silver solutions directly. Silver concentrations can depend upon the specific currency design that determines dispersion over the paper surface. For example, United States paper currency features intaglio printing in the center portrait and four corners. This allows dispersion of silver nano particles from the center out toward the corners and the corners in toward the center. A nano silver concentration of 20 ppm can disperse to the non-printed surfaces at effective concentrations of 5 ppm. For aqueous inks, silver particles and/or molecules can be dispersed throughout the paper by capillary action whereby the wetted fibers act to draw the aqueous solution through the surface.

Example A

An offset ink is prepared by mixing the following ingredients by weight: 0.4% of an ethoxylated trimethylnonanol, 0.3% of an ethoxlyated tetramethyl decyndiol, 2% of a propylene glycol n-propyl ether, 8% 2-pyrrolidone. 5% ethylene glycol, 4% of a self-dispersed carbon pigment, 2% of an acylate binder, about 0.5 parts per million to about 5,000 parts per million biocidal silver, by weight of Ag, and the balance in deionized water. Further, because ink compositions for printing currency are generally unknown, Example A includes formulations containing about 0.1 ppm to about 50 ppm, about 0.2 ppm to about 30 ppm and about 0.5 ppm to about 15 ppm biocidal silver, by weight. Depending on the amount of volatile organics in the formulation, the ink compositions after drying result in concentrations of biocidal silver of from about 15 ppm to about 45 ppm, with about 20 ppm and 40 ppm being preferred.

Example B

An offset ink formulation is prepared by mixing the following ingredients by weight: 0.3% of an ethoxylated surfactant, 0.3% of an ethoxlyated tetramethyl decyndiol, 8% 2-pyrrolidone, 5% polyethylene glycol, 6% of a self-dispersed carbon pigment, 2% of an acrylate binder, about 0.5 parts per million to about 5,000 parts per million viricidal silver, and the balance in deionized water. Example B also includes formulations containing about 0.1 ppm to about 50 ppm, about 0.2 ppm to about 30 ppm and about 0.5 ppm to about 15 ppm biocidal silver, by weight. Depending on the amount of volatile organics in the formulation, the ink compositions after drying result in concentrations of biocidal silver of from about 15 ppm to about 45 ppm, with about 20 ppm and 40 ppm being preferred.

Example C

An offset ink is prepared by mixing the following ingredients by weight: 0.9% of a nonionic ethoxylated surfactant, 0.3% of an ethoxlyated tetaramethyl decyndiol, 2% of a propylene glycol n-propyl ether, 8% 2-pyrrolidone, 5% ethylene glycol, 4% of a self-dispersed carbon pigment, 1.5% of a acrylate binder, about 0.5 parts per million to about 5,000 parts per million viricidal silver, and the balance in deionized water. Example C also includes formulations containing about 0.1 ppm to about 50 ppm, about 0.2 ppm to about 30 ppm and about 0.5 ppm to about 15 ppm biocidal silver, by weight. Depending on the amount of volatile organics in the formulation, the ink compositions after drying result in concentrations of biocidal silver of from about 15 ppm to about 45 ppm, with about 20 ppm and 40 ppm being preferred.

Example D

An offset ink is prepared by mixing the following ingredients by weight: 0.5% of an ethoxylated trimethylnonanol, 0.3% of an ethoxlyated tetralmethyl decyndiol, 0.15% of an alternative ethoxlyated tetramethyl decyndiol, 8% 2-pyrrolidone, 5% ethylene glycol, 5% polyethylene glycol, 4% of a self-dispersed carbon pigment, 2.5% of an acrylate binder, about 0.5 parts per million to about 5,000 parts per million viricidal silver, and the balance in deionized water. Example D also includes formulations containing about 0.1 ppm to about 50 ppm, about 0.2 ppm to about 30 ppm and about 0.5 ppm to about 15 ppm biocidal silver, by weight. Depending on the amount of volatile organics in the formulation, the ink compositions after drying result in concentrations of biocidal silver of from about 15 ppm to about 45 ppm, with about 20 ppm and 40 ppm being preferred.

Intaglio Printing Inks

Intaglio printing inks and formulations therefor are generally described in U.S. Pat. Nos. 4,401,470 and 8,636,307, both of which are hereby incorporated by reference herein in their entirety. Intaglio printing ink compositions generally comprise the components of pigments, for providing the color of the ink, fillers, emulsifiers, solvents, e.g. for adjustment of viscosity, as well as special additives and/or markers for security or forensic purposes. In all forms of the intaglio process, or gravure, printing the design to be printed is etched or engraved below the surface plane of the printing plate. The surface of the plate is then covered with ink to fill the line or pockets of the etching or engraving and the ink is thereafter wiped so as to not disturb the ink in the etching or engraving. Printing is accomplished by pressing the paper firmly against the plate to transfer the ink from the engraving to the paper. One form of the intaglio printing process is the steel plate process used in the machine printing of currency. The ink formulation employed therein depends on the type of plate employed as well as the speed of operation.

Gravure ink compositions are well known and generally comprise a pigment dissolved in an ink vehicle comprised of a resin and volatile solvent. Drying of these inks is generally accomplished by evaporation of the solvent and by penetration of the ink into the substrate, being paper or linen. Recently, such ink compositions include oxidative substances such that the ink may be dried by the application of UV light. UV light can also be used to break elemental silver into nano particles and/or manipulate silver molecules.

The present invention is intended to include all types of intaglio printing process inks to which antiviral silver compositions may be added. Preferred embodiments of the within invention are directed to steel plate process ink compositions which comprise antiviral silver compositions. Ideally, the concentration of the viricidal silver composition in the intaglio ink is such that a uniform concentration is achieved in the paper or linen of 5 ppm by weight of silver, after drying, although other uniform concentrations of silver in the paper are also contemplated to be within the scope of this invention. Accordingly, the viricidal silver may be present in an amount of from about 0.5 parts per million to about 5,000 parts per million.

The intaglio printing inks of the within invention are prepared in a customary manner with the exception of using the viricidal silver compositions as an essential component of the vehicle. For example, 100 parts by weight of the resin and 1 part of the viricidal composition are dissolved in up to 200 parts by weight of a petroleum solvent such as a mixture containing 70 weight % toluene, 4 weight % xylene and 26 weight % lactol spirits. A pigment such as Phthalocyanine Blue, Benzidine Yellow, channel black, Carmine 6B or titanium white is added and the mixture is placed in a ball mill and ground until a uniform dispersion is obtained. This procedure results in an ink composition that may be subsequently diluted with additional solvent. Further, additional components such as antioxidants, and other additives to improve printability, flow behavior, and pigment wetting, for example, in amounts from 1-15% by weight calculated on the resin.

Example E

A gravure printing ink consisting of about 47% hydrocarbon solvent and about 53% solids of which about 43% is resin and about 57% is pigment, such a channel carbon, and about 0.0005 to about 0.5 weight percent of viricidal silver (about 5 to 5,000 ppm). Example E also includes formulations containing about 0.1 ppm to about 50 ppm, about 2.0 ppm to about 30 ppm and about 2.5 ppm to about 15 ppm biocidal silver, by weight. Depending on the amount of volatile organics in the formulation, the ink compositions after drying result in concentrations of biocidal silver of from about 0.2 ppm to about 100 ppm, with about 5 ppm and 15 ppm being preferred. When the ink is pressed under pressure into the paper, it becomes a integral part of the paper. Germicidal properties project out from the printing to create a sanitized field.

Paper Making

Paper is generally made by a process that begins by creating a pulp slurry in a headbox. See Provisional Application. The pulp slurry could be a mixture of wood pulp, as in ordinary paper or it could be linen fibers, cotton or rag fibers to create the linen stock that many currencies are now printed on. The pulp slurry is extruded onto a roller system where the fibers in the pulp slurry are formed into a sheet that is then pressed while still wet, and then dried. In addition, polymers and synthetic materials may be used in place of paper or fabric mediums for currency including Tyvek®, Nomex®, Kevlar® and similar materials. These media resemble paper but are far more durable with extended lifecycles. Synthetic material can include, but is not limited to high-density spunbound polyethylene fibers, polypropylene, and polybutylene by way of examples. Nano silver, for example, would be introduced in the spinning or curing process as well as being bound to the material when printed.

In a preferred embodiment of the within invention, a biocidal silver composition is added to the pulp slurry in the headbox. Although any biocidal silver composition disclosed herein can be used, a nanoparticulate silver composition is preferred, either in solution or in colloidal form. The nanoparticulate silver composition is added to the pulp slurry in various concentrations which are dictated by the mechanics of the paper-making process in use at the time. Ideally, the concentration of the nanoparticulate silver composition in the wet pulp is such that a uniform concentration is achieved in the paper or linen of 5 ppm by weight of silver, after drying, although other uniform concentrations of silver in the paper are also contemplated to be within the scope of this invention.

In an alternative embodiment of this invention, an additional step in the paper-making process is added where a biocidal silver composition is pressed onto the surface of the raw paper after drying such as to achieve a surface concentration of 5 ppm silver by weight.

In a further embodiment of this invention, nano silver particles can be incorporated into polymers and synthetic materials that may be used in place of paper or fabric mediums for currency including Tyvek®, Nomex®, Kevlar® and similar materials. These media can resemble paper but are far more durable with extended lifecycles. Synthetic material can include, but is not limited to high-density spunbound polyethylene fibers, polypropylene, and polybutylene by way of examples. Nano silver would be introduced in the spinning or curing process as well as being bound to the material when printed.

Example F

A pulp slurry for making currency substrate consisting of an amount of fiber material composed of about 75% cotton fibers and about 25% linen fibers, and about 0.0005 to about 0.5 weight percent of viricidal silver (about 5 to 5,000 ppm), relative to the weight of fiber material. Example F also includes formulations containing about 0.1 ppm to about 50 ppm, about 2.0 ppm to about 30 ppm and about 2.5 ppm to about 15 ppm biocidal silver, by weight. Depending on the amount of water and any other volatile materials in the pulp slurry, the currency substrate after drying, provides concentrations of biocidal silver within the substrate of from about 0.2 ppm to about 100 ppm, with about 5 ppm and 15 ppm being preferred, measured as the weight of silver with respect to the weight of the dried substrate.

The preceding preferred embodiments are illustrative of the practice of the invention. It is to be understood, however, that other expedients known to those of skill in the art, or disclosed herein, may be employed without departing from the spirit of the invention or the scope of the claims.

What is claimed is:

1. A gravure printing ink composition, comprising:
a non-aqueous vehicle;
a colorant;
wherein the non-aqueous vehicle comprises a hydrocarbon solvent, wherein the hydrocarbon solvent is present in about 47% by weight with respect to the total content of the ink composition, wherein said colorant comprises channel carbon, wherein the channel carbon is present in about 57% by weight with respect to the total solids content of the ink composition, and said biocidal silver is present.

2. The gravure printing ink composition of claim 1, wherein said ink composition comprises about 0.2 ppm to about 100 ppm biocidal silver after drying, measured as the weight of silver.

3. The gravure printing ink composition of claim 2, wherein said ink composition comprises about 5 ppm to about 15 ppm biocidal silver after drying, measured as the weight of silver.

4. An intaglio printing ink composition, comprising:
a non-aqueous vehicle;
an optional co-solvent;
a colorant;
the improvement which comprises adding to said composition a biocidally effective amount of biocidal silver, said biocidal silver being selected from the group consisting of elemental silver, nanoparticulate silver, colloidal silver, and inorganic silver and silver ions; wherein
said biocidally effective amount of biocidal silver is an amount of biocidal silver that results in an amount of silver being present on the surface of a currency substrate after printing that neutralizes or destroys bacteria and viruses;
and wherein said non-aqueous vehicle comprises a hydrocarbon solvent, wherein the hydrocarbon solvent is present in about 47% by weight with respect to the total content of the ink, said colorant comprises channel carbon, wherein the channel carbon is present in about 57% by weight with respect to the total solids content of the ink, and wherein said biocidal silver is present in an amount of from about 0.1 ppm to about 50 ppm measured as the weight of silver.

5. The intaglio printing ink composition of claim 4, wherein said ink composition comprises about 0.2 ppm to about 100 ppm biocidal silver after drying, measured as the weight of silver.

6. The intaglio printing ink composition of claim 5, wherein said ink composition comprises about 5 ppm to about 15 ppm biocidal silver after drying, measured as the weight of silver.

* * * * *